US012562154B2

(12) United States Patent
Biadsy et al.

(10) Patent No.: US 12,562,154 B2
(45) Date of Patent: Feb. 24, 2026

(54) SCALABLE MODEL SPECIALIZATION FRAMEWORK FOR SPEECH MODEL PERSONALIZATION

(71) Applicant: Google LLC, Mountain View, CA (US)

(72) Inventors: Fadi Biadsy, Sandyston, NJ (US); Youzheng Chen, Mountain View, CA (US); Xia Zhang, Mountain View, CA (US); Oleg Rybakov, Mountain View, CA (US); Andrew M. Rosenberg, Brooklyn, NY (US); Pedro J. Moreno Mengibar, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 318 days.

(21) Appl. No.: 18/184,630

(22) Filed: Mar. 15, 2023

(65) Prior Publication Data

US 2023/0298574 A1    Sep. 21, 2023

Related U.S. Application Data

(60) Provisional application No. 63/269,611, filed on Mar. 18, 2022.

(51) Int. Cl.
*G10L 15/16* (2006.01)
*G10L 15/02* (2006.01)
*G10L 15/06* (2013.01)

(52) U.S. Cl.
CPC .............. *G10L 15/16* (2013.01); *G10L 15/02* (2013.01); *G10L 15/063* (2013.01); *G10L 2015/025* (2013.01)

(58) Field of Classification Search
None
See application file for complete search history.

(56) References Cited

U.S. PATENT DOCUMENTS 12,249,336 B2 *  3/2025  Li ............................ G10L 15/16
12,367,860 B2 *  7/2025  Ganong, III ............ G10L 15/08
(Continued)

FOREIGN PATENT DOCUMENTS

JP      2019528476  A    10/2019
JP      2021033048  A    3/2021
(Continued)

OTHER PUBLICATIONS

Houlsby et al. "Parameter-Efficient Transfer Learning for NLP" Jun. 13, 2019, Proceedings of the 36th International Conference on Machine Learning (Year: 2019).*
(Continued)

*Primary Examiner* — Pierre Louis Desir
(74) *Attorney, Agent, or Firm* — Honigman LLP; Brett A. Krueger; Grant Griffith

(57) ABSTRACT

A method for speech conversion includes obtaining a speech conversion model configured to convert input utterances of human speech directly into corresponding output utterances of synthesized speech. The method further includes receiving a speech conversion request including input audio data corresponding to an utterance spoken by a target speaker associated with atypical speech and a speaker identifier uniquely identifying the target speaker. The method includes activating, using the speaker identifier, a particular sub-model for biasing the speech conversion model to recognize a type of the atypical speech associated with the target speaker identified by the speaker identifier. The method includes converting, using the speech conversion model biased by the activated particular sub-model, the input audio data corresponding to the utterance spoken by the target speaker associated with atypical speech into output audio data corresponding to a synthesized canonical fluent speech representation of the utterance spoken by the target speaker.

20 Claims, 10 Drawing Sheets

(56) References Cited

U.S. PATENT DOCUMENTS

| | | | | | |
|---|---|---|---|---|---|
| 2020/0380215 | A1* | 12/2020 | Kannan | ................. | G10L 15/005 |
| 2021/0209315 | A1* | 7/2021 | Jia | ........................... | G10L 13/00 |
| 2023/0169954 | A1* | 6/2023 | Thomas | ................. | G10L 15/16 |
| | | | | | 704/200 |

FOREIGN PATENT DOCUMENTS

| | | | |
|---|---|---|---|
| WO | 2021154563 | A1 | 8/2021 |
| WO | 2022046526 | A1 | 3/2022 |

OTHER PUBLICATIONS

Irie et al. "On the Choice of Modeling Unit for Sequence-to-Sequence Speech Recognition" Jul. 23, 2019, Human Language Technology and Pattern Recognition Group (Year: 2019).*

Bapna et al. "Simple, Scalable Adaptation for Neural Machine Translation" Sep. 18, 2019 (Year: 2019).*

Michel et al. "Extreme Adaptation for Personalized Neural Machine Translation" Language Technologies Institute Carnegie Mellon University May 4, 2018 (Year: 2018).*

International Search Report and Written Opinion for the related Application No. PCT/US2023/064492 dated May 22, 2023, 144 pages.

Doshi Rohan et al: "Extending Parrotron: An End-to-End, Speech Conversion and Speech Recognition Model for Atypical Speech", ICASSP 2021—2021 IEEE International Conference on Acoustics, Speech and Signal Processing (ICASSP), IEEE, Jun. 6, 2021 (Jun. 6, 2021), pp. 6988-6992, XP033954374, DOI: 10.1109/ICASSP39728. 2021.9414644 [retrieved on Apr. 22, 2021] abstract; figure 1, 5 pages.

Fadi Biadsy et al: "Parrotron: An End-to-End Speech-to-Speech Conversion Model and its Applications to Hearing-Impaired Speech and Speech Separation", arxiv.org, Cornell University Library, 201 Olin Library Cornell University Ithaca, NY 14853, Apr. 8, 2019 (Apr. 8, 2019), XP081515314, abstract; figure 1 pp. 1-2, 5 pages.

Harvill John et al: "Synthesis of New Words for Improved Dysarthric Speech Recognition on an Expanded Vocabulary", ICASSP 2021—2021 IEEE International Conference on Acoustics , Speech and Signal Processing (ICASSP), IEEE, Jun. 6, 2021 (Jun. 6, 2021), pp. 6428-6432, XP033955158, DOI: 10.1109/ICASSP39728. 2021. 9414869 [retrieved on Apr. 22, 2021] abstract; figure 1 pp. 1-2, 5 pages.

Chen Chen-Yu et al: "Enhancing Intelligibility of Dysarthric Speech Using Gated Convolutional-Based Voice Conversion System", Interspeech 2020, Feb. 2, 2020 (Feb. 2, 2020), pp. 4686-4690, XP093046276 , ISCA DO : 10.21437/Interspeech.2020-1367 abstract; figure. 1 pp. 1-3, 6

Berrak Sisman et al: "An overview of Voice Conversion and its Challenges: From Statistical Modeling to Deep Learning", arxiv. org, Cornell University Library, 201 Olin Library Cornell University Ithaca, NY 14853, Aug. 9, 2020 (Aug. 9, 2020), XP081737256, abstract; figure 1, 27 pages.

Berrak Sisman et al: "Ari Overview of Voice Conversion and its Challenges: From Statistical. Modeling to Deep Learning", arxiv. org, Cornell University Library, 201 Olin Library Cornell University Ithaca, NY 14853, Nov. 17, 2020 (Nov. 17, 2020), XP081814065 , abstract; figure 1 pp. 1-4, 28 pages.

Momina Masood et al: "Deepfakes Generation and Detection: State-of-the-art, open challenges, countermeasures, and way forward", arxiv.org, Cornell University Library, 201 Olin Library Cornell University Ithaca, NY 14853, Feb. 25, 2021 (Feb. 25, 2021), XP091086852, abstract; figure 9 pp. 24-26, 54 pages.

Japanese Office Action for the related Application No. 2024-555419 dated Oct. 21, 2025.

* cited by examiner

300c

105

Encoder
310

Conformer Blocks
360

312

Spectrogram
Decoder
320, 320a

Cross
Attention
331, 331a

LSTM
333, 333a

Conv
335

224, 224a

Word Piece
Decoder
320, 320b

Cross
Attention
331, 331b

LSTM
333, 333b

Softmax
345, 345a 224, 224b

Phoneme
Decoder
320, 320c

Cross
Attention
331, 331c

LSTM
333, 333c

Softmax
345, 345b 224, 224c

FIG. 5

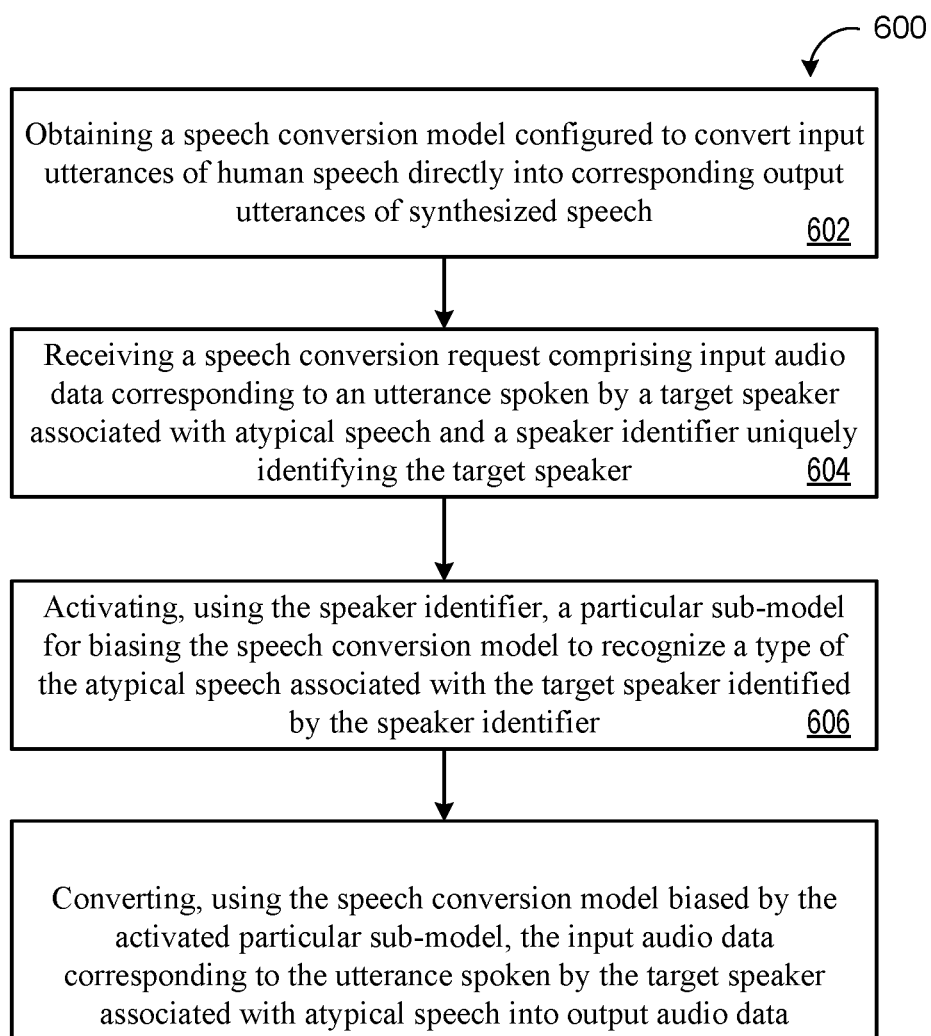

600

Obtaining a speech conversion model configured to convert input utterances of human speech directly into corresponding output utterances of synthesized speech
602

Receiving a speech conversion request comprising input audio data corresponding to an utterance spoken by a target speaker associated with atypical speech and a speaker identifier uniquely identifying the target speaker          604

Activating, using the speaker identifier, a particular sub-model for biasing the speech conversion model to recognize a type of the atypical speech associated with the target speaker identified by the speaker identifier          606

Converting, using the speech conversion model biased by the activated particular sub-model, the input audio data corresponding to the utterance spoken by the target speaker associated with atypical speech into output audio data corresponding to a synthesized canonical fluent speech representation of the utterance spoken by the target speaker
608

FIG. 6

SCALABLE MODEL SPECIALIZATION FRAMEWORK FOR SPEECH MODEL PERSONALIZATION

CROSS REFERENCE TO RELATED APPLICATIONS

This U.S. patent application claims priority under 35 U.S.C. § 119(e) to U.S. Provisional Application 63/269,611, filed on Mar. 18, 2022. The disclosure of this prior application is considered part of the disclosure of this application and is hereby incorporated by reference in its entirety.

TECHNICAL FIELD

This disclosure relates to a scalable model specialization framework for speech model personalization.

BACKGROUND

Speech conversion models can be used to modify the speech of a source speaker into another form without changing the linguistic information of the speech. For example, a speech conversion model can produce a transcript of a user's speech. Alternatively, a speech conversion model can translate a user's speech into an audio waveform of the speech in another language. Machine learning methods can be used to train speech conversion models accurately and efficiently convert speech into another form. Speech conversion models are typically large models that are trained on large data sets and are thus generically adapted for a large set of users.

SUMMARY

One aspect of the disclosure provides a computer-implemented method for biasing a speech conversion model using a sub-model. The computer-implemented method when executed by data processing hardware causes the data processing hardware to perform operations including obtaining a speech conversion model configured to convert input utterances of human speech directly into corresponding output utterances of synthesized speech. The operations include receiving a speech conversion request that includes input audio data corresponding to an utterance spoken by a target speaker associated with atypical speech and a speaker identifier uniquely identifying the target speaker. The operations further include activating, using the speaker identifier, a particular sub-model for biasing the speech conversion model to recognize a type of the atypical speech associated with the target speaker identified by the speaker identifier. The operations also include converting, using the speech conversion model biased by the activated particular sub-model, the input audio data corresponding to the utterance spoken by the target speaker associated with atypical speech into output audio data corresponding to a synthesized canonical fluent speech representation of the utterance spoken by the target speaker.

Implementations of the disclosure may include one or more of the following optional features. In some implementations, the speech conversion model is trained on generalized training data and speaker- and domain-independent. In some implementations the speech conversion model includes an encoder configured to encode the input audio data corresponding to the utterance. In these implementations, the speech conversion model also includes a decoder configured to receive, as input, the encoded audio data from the encoder and generate, as output, the output audio data corresponding to the synthesized canonical fluent speech representation of the utterance. In these implementations, the encoder may include a stack of self-attention blocks each having a multi-headed self attention mechanism. In these implementations, the sub-model may include a stack of residual adaptors disposed between each of the self-attention blocks in the stack of self-attention blocks of the encoder. Further, in these implementations, each residual adaptor may include a normalization layer, followed by a feed-forward layer with down=projection to a bottleneck dimension and a non-linear activation, and another feed-forward layer with up-projection. In these implementations, the speech conversion model may further include a wordpiece decoder configured to receive, as input, the encoded audio data from the encoder and generate, as output, a textual representation corresponding to a transcription of the utterance. Alternatively, in these implementations, the speech conversion model may further include a phoneme decoder configured to receive, as input, the encoded audio data from the encoder and generate, as output, a phoneme representation of the utterance.

The input audio data may include one of an input spectrogram or an input audio waveform and the output audio data may include one of an output spectrogram or an output audio waveform. In some implementations, activating the particular sub-model for biasing the speech conversion model includes selecting, from among a plurality of sub-models each associated with a different type of atypical speech, the particular sub-model associated with the type of atypical speech associated with the target speaker. The implementations further include loading the particular sub-model into the speech conversion model for biasing the speech conversion model to recognize the type of the atypical speech associated with the target speaker.

Another aspect of the disclosure provides a system for biasing a speech conversion model using a sub-model. The system includes data processing hardware and memory hardware in communication with the data processing hardware. The memory hardware stores instructions that when executed on the data processing hardware cause the data processing hardware to perform operations. The operations include obtaining a speech conversion model configured to convert input utterances of human speech directly into corresponding output utterances of synthesized speech. The operations include receiving a speech conversion request that includes input audio data corresponding to an utterance spoken by a target speaker associated with atypical speech and a speaker identifier uniquely identifying the target speaker. The operations further include activating, using the speaker identifier, a particular sub-model for biasing the speech conversion model to recognize a type of the atypical speech associated with the target speaker identified by the speaker identifier. The operations also include converting, using the speech conversion model biased by the activated particular sub-model, the input audio data corresponding to the utterance spoken by the target speaker associated with atypical speech into output audio data corresponding to a synthesized canonical fluent speech representation of the utterance spoken by the target speaker.

This aspect may include one or more of the following optional features. In some implementations, the speech conversion model is trained on generalized training data and speaker- and domain-independent. In some implementations the speech conversion model includes an encoder configured to encode the input audio data corresponding to the utterance. In these implementations, the speech conversion model also includes a decoder configured to receive, as input, the encoded audio data from the encoder and generate, as output, the output audio data corresponding to the synthesized canonical fluent speech representation of the utterance. In these implementations, the encoder may include a stack of self-attention blocks each having a multi-headed self attention mechanism. In these implementations, the sub-model may include a stack of residual adaptors disposed between each of the self-attention blocks in the stack of self-attention blocks of the encoder. Further, in these implementations, each residual adaptor may include a normalization layer, followed by a feed-forward layer with down-projection to a bottleneck dimension and a non-linear activation, and another feed-forward layer with up-projection. In these implementations, the speech conversion model may further include a wordpiece decoder configured to receive, as input, the encoded audio data from the encoder and generate, as output, a textual representation corresponding to a transcription of the utterance. Alternatively, in these implementations, the speech conversion model may further include a phoneme decoder configured to receive, as input, the encoded audio data from the encoder and generate, as output, a phoneme representation of the utterance.

The input audio data may include one of an input spectrogram or an input audio waveform and the output audio data may include one of an output spectrogram or an output audio waveform. In some implementations, activating the particular sub-model for biasing the speech conversion model includes selecting, from among a plurality of sub-models each associated with a different type of atypical speech, the particular sub-model associated with the type of atypical speech associated with the target speaker. The implementations further include loading the particular sub-model into the speech conversion model for biasing the speech conversion model to recognize the type of the atypical speech associated with the target speaker.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 5 is a schematic view of an example training scheme for a sub-model for the speech conversion model.

FIG. 6 a flowchart of an example arrangement of operations for a method of performing speech conversion using a speech conversion model modified with a sub-model.

Like reference symbols in the various drawings indicate like elements.

DETAILED DESCRIPTION

Figure 1:
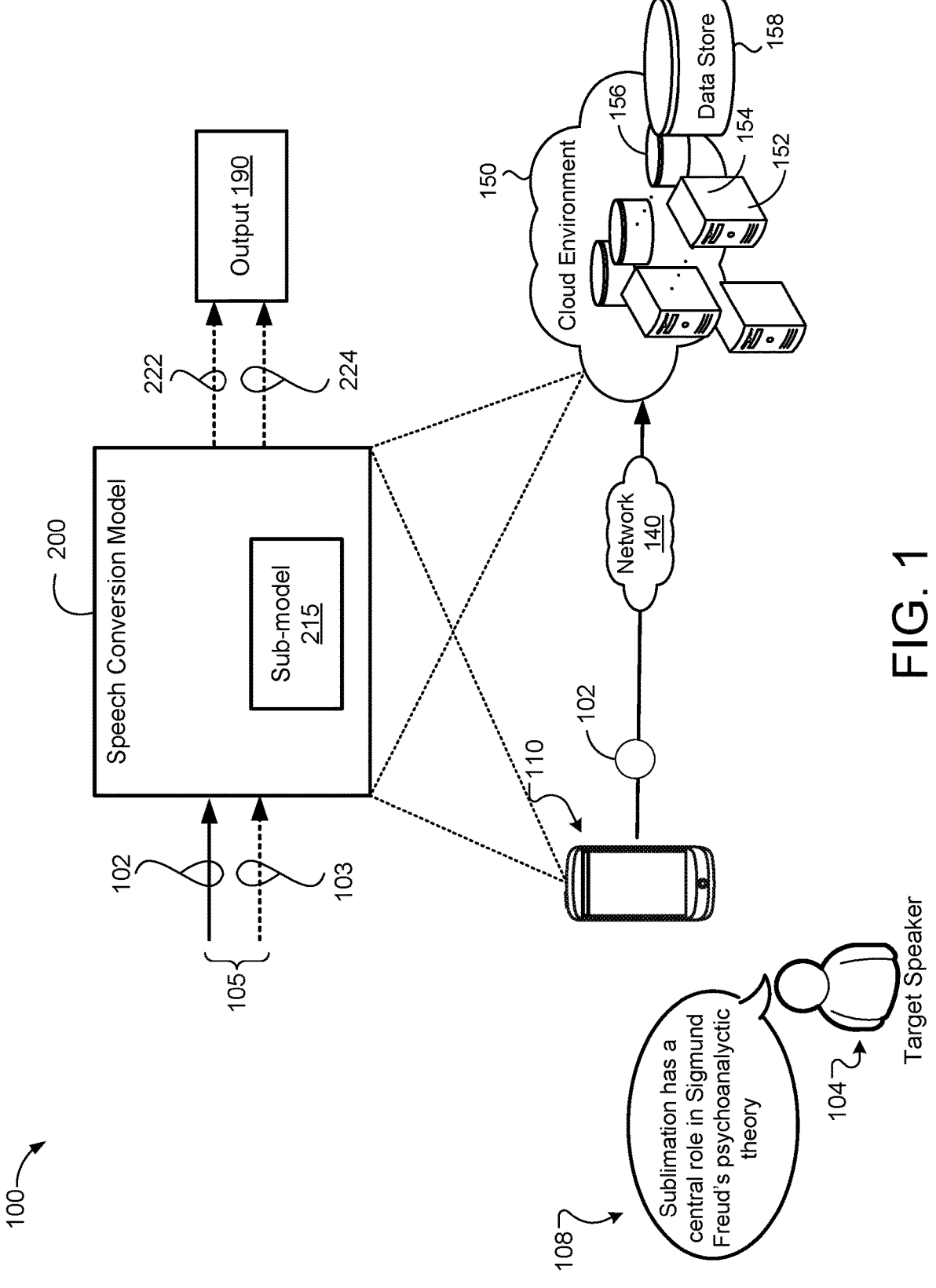
FIG. 1 is a schematic view of an example system for speech conversion system including a speech conversion model.

There is growing interest to develop more inclusive speech technologies, particularly those that can help people with speech impairments. Automated speech recognition (ASR) has made tremendous strides with the introduction of end-to-end (E2E) deep learning-based models to recognize speech from speakers with dysarthric or atypical speech patterns for conversion into accurate transcriptions. For instance, atypical speech patterns may include, without limitation, impaired speech due to physical or neurological conditions (e.g., speakers with Amyotrophic Lateral Sclerosis (ALS) disease), heavily-accented speech, and deaf speech. Similar deep learning-based models can be applied by speech conversion systems to convert speech with atypical speech patterns into canonical fluent output speech.

Using machine learning techniques, speech conversion models may be trained on large sets of training data including audio samples of speech to produce a robust model for speech recognition/conversion. Generally, these speech conversion models are large, as the more extensively the model is trained, the better it performs. However, there are drawbacks to using such large models such as a single model used for a wide variety of users with different characteristics. For example, a single speech conversion model may be built for users with typical speech patterns even though some users may have atypical speech patterns. In turn, the speech conversion model may not perform as accurately for certain groups of users. Further, it is difficult to retrain or update models due to the size because of the computational expenses. This may cause the speech conversion model to be out of date and not perform well for new/emerging words/phrases (e.g., slang, new TV shows).

Neural model fine-tuning and adaptation have become standard approaches for model specialization or task customization. Fine-tuning the entire model or a subset of the parameters of the model has shown substantial gains for a wide range of downstream tasks. However, these techniques pose scalability limitations for both training and inference when applied to a large number of tasks, domains, conditions, and/or users.

Implementations herein are directed toward integrating one or more sub-models with a base speech conversion model to personalize the base speech conversion model for converting speech in a particular domain (i.e., a particular user and/or a type of speech associated with the user). A sub-model includes a set of parameters that can be added to or replaced from the general base speech conversion model. The sub-model can be loaded/enabled/disabled when necessary, allowing use of the base speech conversion model without personalization, thereby nullifying issues that arise from modifying a larger model, such as catastrophic forgetting concerns. In some examples, the base speech conversion model is trained and then the parameters of the base speech conversion model are frozen during operation (i.e., inference). In this manner, the base speech conversion model remains stable and can continue to work for general traffic or multiple users/domains. However, when speaker identification information is available, the base speech conversion model may activate an appropriate sub-model for a particular speaker and/or or a particular type of speech, in order to perform speech conversion based on the user's type of speech. One advantage of these implementations includes the ability to train the sub-models individually without having to train or retrain the large base speech conversion model. Further, one or more sub-models can be loaded and replaced dynamically and in real time per request (e.g., using a memory cache). The base speech conversion model remains unchanged with or without the use of sub-models, which eliminates concerns that the model will be compromised through use and/or updates.

As used herein, and unless specified otherwise, the terms "speech conversion system" and "speech conversion model" can refer to any combination of an ASR system/model, in which input atypical speech is recognized and converted into corresponding text (e.g., transcription) and/or a set of phonemes representing the atypical speech, or a speech-to-speech conversion system/model, in which the input atypical speech is directly converted into canonical fluent synthesized speech without performing speech recognition. Stated differently, the speech conversion system/model is configured to convert an input audio waveform or spectrograms corresponding to the atypical speech directly into an output audio waveform or spectrograms corresponding to the canonical fluent speech without converting the input audio waveform into an intermediate representation (e.g., text or phonemes). As will become apparent, speech conversion models, as well as techniques for training speech conversion models, will enable a user with atypical speech to speak to, and be understood by, both other humans and speech interfaces (e.g., digital assistants) by enabling recognition and/or reproduction of the user's intended speech. While examples herein depict a speech conversion model receiving an input audio waveform or spectrograms corresponding to atypical speech for conversion into an output audio waveform or spectrograms corresponding to canonical fluent speech, the speech conversion model can similarly be adapted to perform other types of voice conversion tasks without departing from the scope of the present disclosure. For instance, the speech conversion model may convert an input audio waveform or spectrograms corresponding to an utterance in a first language into an output audio waveform or spectrograms corresponding to a translation of the utterance in a different second language. The speech conversion model may similarly receive spoken inputs by a user and output synthesized speech that contains the same linguistic content of the spoken inputs but with different voice characteristics of a target speaker FIG. 1 illustrates a speech conversion system 100 including an automatic speech conversion model 200 and a sub-model 215. The speech conversion model 200, using the sub-model 215, is configured to process a speech conversion request 105. The speech conversion request 105 includes input audio data 102 corresponding to an utterance 108 spoken by a target speaker 104 and captured by a user device 110. The speech conversion request 105 may also include a speaker identifier 103. Using the audio data 102 and the speaker identifier 103, the speech conversion model 200 and the sub-model 215 generate or predict an unbiased speech representation 222 or a biased speech representation 224. The biased speech representation 224 is more likely to include words or phrases associated with a particular user and/or a particular speech type that the speech conversion model 200 is biased toward using sub-model 215 (e.g., based on the speaker identifier 103). In some implementations, when the target speaker 104 is identified as having atypical speech, the speech representation 224 is a synthesized canonical fluent speech representation 224 of the utterance 108 spoken by the target speaker 104. In some examples, the input audio data 102 includes input spectrograms corresponding to the utterance 108. The speaker identifier 103 may provide an indication of a particular user and/or a particular domain (i.e., speech type) among a plurality of different domains each signifying or representing a respective biasing context of the utterance 108.

While not shown, an acoustic front-end residing on the user device 110 may convert a time-domain audio waveform of the utterance 108 captured via a microphone of the user device 110 into the input spectrograms 102 or other type or form of audio data 102. Further, the front-end device may be configured to determine or obtain data representing a speaker identifier 103 affecting the utterance 108 and/or other pertinent information corresponding to the target speaker 104 and/or client device 110.

The user device 110 associated with the target speaker 104 may capture the utterance 108 spoken by the target speaker 104 and provide the corresponding input audio data 102 as part of a speech conversion request 105 to the speech conversion system 100. Additionally, the user device 110 may determine a speaker identifier 103 to include with the speech conversion request 105. The user device 110 may include, without limitation, a smart phone, tablet, desktop/laptop computer, smart speaker, smart display, smart appliance, assistant-enabled wearable device (e.g., smart watch, smart headphones, smart glasses, etc.), or vehicle infotainment system. Alternatively, a remote server 112 may process the audio data 102 and any other additional data or metadata from the user device 110 to determine the speaker identifier 103.

The speech conversion system 100 may be distributed across multiple devices such that the speech conversion model 200 resides on one of the user device 110 or a remote system 150 (also referred to herein as a cloud computing environment) in communication with the user device 110 via a network 140. The remote system 150 may be a single computer, multiple computers, or a distributed system (e.g., a cloud environment) having scalable/elastic resources 152 including computing resources 154 (e.g., data processing hardware) and/or storage resources 156 (e.g., memory hardware). A data store 158 (i.e., a remote storage device) may be overlain on the storage resources 146 to allow scalable use of the storage resources 146 by one or more user device 110 or the computing resources 154. The speech conversion model 200 and the sub-model 215 may execute on the remote system 150 or the user device 110. The sub-model 215 may be stored locally at the user device 110 or stored on the remote system (e.g., at the data store 158), or some combination there between.

The speech conversion system 100 implements a dynamic model including two or more component parts or models including a general base model (e.g., the speech conversion model 200) and a "swappable" sub-model 215 to generate biased speech representations 224 based on a received speech conversion request 105. The speech conversion model 200 may be trained on a large set of speech data. Once trained, the speech conversion model 200 may be frozen, such that the parameters of the speech conversion model 200 remain constant during operation. The speech conversion model 200 may be updated, retrained, or replaced as necessary or when additional training data becomes available. In some implementations, a single sub-model 215 is used for biasing the speech conversion model 200 by activating certain parameters based on the speaker identifier 103 of the speech conversion request 105. In other implementations, the system 100 includes a plurality of sub-models 215, with each sub-model 215 corresponding to a particular domain (i.e., a particular user and/or a particular speech type). In these implementations, a particular sub-model 215 is selected/activated based on the speaker identifier 103. For example, when a speaker identifier 103 indicates that the target speaker 104 has a speech type associated with atypical speech (e.g., a stutter), the speech conversion model 200 may activate the sub-model 215 associated with that speech type. When the speech conversion request 105 does not have a speaker identifier 103 or when a sub-model 215 corresponding to the speaker identifier 103 does not exist or is under-developed, the speech conversion model 200, in some examples, generates an unbiased speech representation 222. That is, the unbiased speech representation 222 is generated solely by the speech conversion model 200 and is not affected or influenced by any sub-model 215.

The speaker identifier 103 may be based on any signal or data that can be used to improve accuracy of the biased speech representation 224. The speaker identifier 103 may be based on information related to the target speaker 104. For example, the target speaker 104 has a specific dialect, accent, native language, mannerisms, pattern of speech, speech disfluencies, etc. Accordingly, the system 100 may generate and train a sub-model 215 corresponding to the target speaker 104, where the sub-model 215 biases/personalizes the speech conversion model 200 to make predictions that suit the target speaker 104 specifically. In some implementations, the speaker identifier 103 includes a one-hot vector and the system uses the speaker identifier 103 to select an appropriate sub-model 215 (i.e., the sub-model 215 corresponding to the target speaker 104) from a plurality of different sub-models 215.

In some implementations, the speaker identifier 103 is based on information related to the user device 110. For example, the user device 110 is associated with a particular user (i.e., target speaker 104) and thus any utterance 108 associated with the user device 110 is transmitted as a speech conversion request 105 including a speaker identifier 103 indicative of the particular user. Further, the user device 110 may include a smart device equipped with sensors such as GPS, an accelerometer, a gyroscope, a microphone, a proximity sensor, a camera, etc. Alternatively, the speech conversion model 200 may identify a particular speech type based on an analysis of the audio input 102 and thus determine a speaker identifier 103 associated with the speech type.

The speaker identifier 103 may indicate a domain related to the user device 110, as inferred from one of the sensors. For example, the speaker identifier 103 may indicate a geographical location of the user device 110, as inferred from GPS data (with the explicit consent by the user 104 to share his/her geographical location which may be revoked at any time). Here, the speaker identifier 103 may correspond to a more geographical location (e.g., a city such as Chicago) or to a more particular location (e.g., a gym). In either instance, the sub-model 215 may bias the biased speech representation 224 toward a particular domain (i.e., speech type) based on the location. In particular, a speaker identifier 103 identifying the location Chicago may activate a sub-model 215 trained on data from users from that city, state, and/or region, which may be biased based on accents or other features of speech of users from that area as well as named entities (e.g., restaurants, sports teams, street names, etc.) unique to that region. As a result, the sub-model 215 may bias the speech conversion model 200 to generate a biased speech representation 224 biased toward predictions that fit that domain. For example, the biased speech representation 224 may increase a likelihood of the speech conversion model 200 predicting that the utterance 108 includes a reference to a restaurant or street in Chicago. Similarly, a speaker identifier 103 indicating the source speaker 104 is at a gym may activate a sub-model 215 trained based on speech from users that are exercising or are in similar locations. Here, the speech may be influenced by labored breathing or directed to particular words or phrases (e.g., voice instructions for operating a music player on a smart device). Accordingly, the sub-model 215 can factor in these contextual elements when processing the audio data 102 to produce the biased speech representation 224.

In some implementations, the speaker identifier 103 indicates that multiple domains are applicable to the utterance 108. In this scenario, a single sub-model 215 may bias the speech conversion model 200 to generate biased speech representations 224 toward each of the multiple domains. Alternatively, multiple sub-models 215 (each trained for one or more of the multiple domains) may bias the speech conversion model 200 to generate biased speech representations 224 toward each of the multiple domains. For example, when the target speaker 104 is has a particular speech type (e.g., a stutter) and is located in a particular location associated with an accent (e.g., Boston), one or more sub-models 215 may bias the output of the speech conversion model 200 toward each of these domains.

An output 190 may receive the un-biased and biased speech representations 222, 224 generated by the speech conversion model 200. In some examples, the output is a canonical fluent speech representation 222, 224 of the utterance 108 when the speech conversion model 200 is configured to process atypical speech. In other examples, the output 190 includes a natural language understanding (NLU) that performs query interpretation on the speech conversion results. The NLU may further instruct a downstream application/service to perform an action based on the results. The output 190 may also include a user interface generator configured to display the speech conversion results as a transcription on a screen of the user device 110 and/or another device. Similarly, the output 190 may be fed to a vocoder (not pictured) to produce a time-domain audio waveform of the synthesized canonical fluent speech representation of the utterance 108.

The system of FIG. 1 is presented for illustrative purposes only and is not intended to be limiting. For example, although only a single example of each component is illustrated, the system 100 may include any number of components 110, 112, 140, 150, 200, and 215. Further, although some components are described as being located in a cloud computing environment 150, in some implementations those components may be hosted locally on the user device 110. Further, in various implementations, some or all of the components 112, 200, and 215, are hosted locally on user device 110, remotely (such as in cloud computing environment 150), or some combination thereof.

Figure 2A:
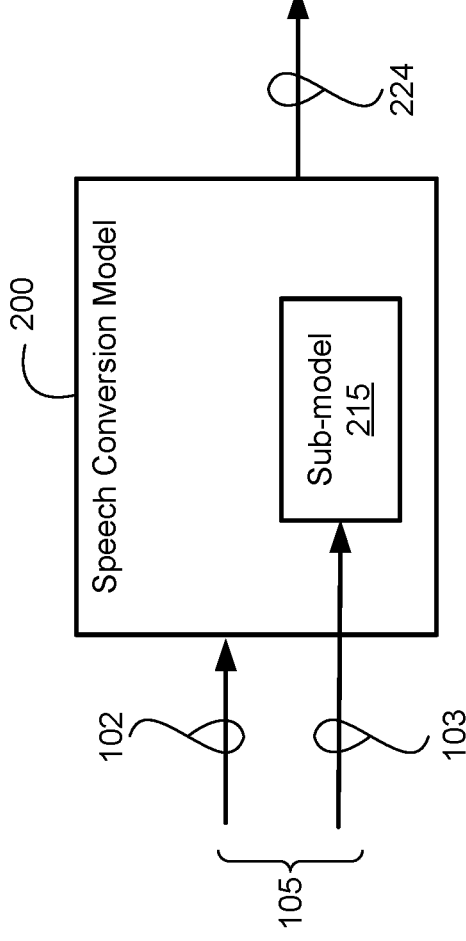
FIG. 2A is a schematic view of a speech conversion model for producing a speech representation using a sub-model.

Referring now to FIG. 2A, an exemplary speech conversion model 200 implements a sub-model 215 to produce the biased speech representation 224 (e.g., a synthesized canonical fluent speech representation 224). Here, the speech conversion model 200 receives a speech conversion request 105 including the audio data 102 and the speaker identifier 103. In this instance, the sub-model 215 includes a single model trained on various inputs and contexts corresponding to a variety of domains. The speaker identifier 103 may be a one-hot vector indicating one or more particular domains (e.g., particular users and/or particular speech types) corresponding to the context of the audio data 102. The one-hot vector may be concatenated and projected into a phrase set embedding prior to being transmitted to the sub-model 215. In some implementations, the one-hot vector is looked up in an embedding matrix before being projected into a phrase set embedding. Alternatively, the sub-model 215 may project the one-hot vector into a phrase set embedding. The sub-model may then activate one or more parameters corresponding to one or more particular domains indicated by the speaker identifier 103 based on the phrase set embedding to process the audio data 102.

Figure 2B:
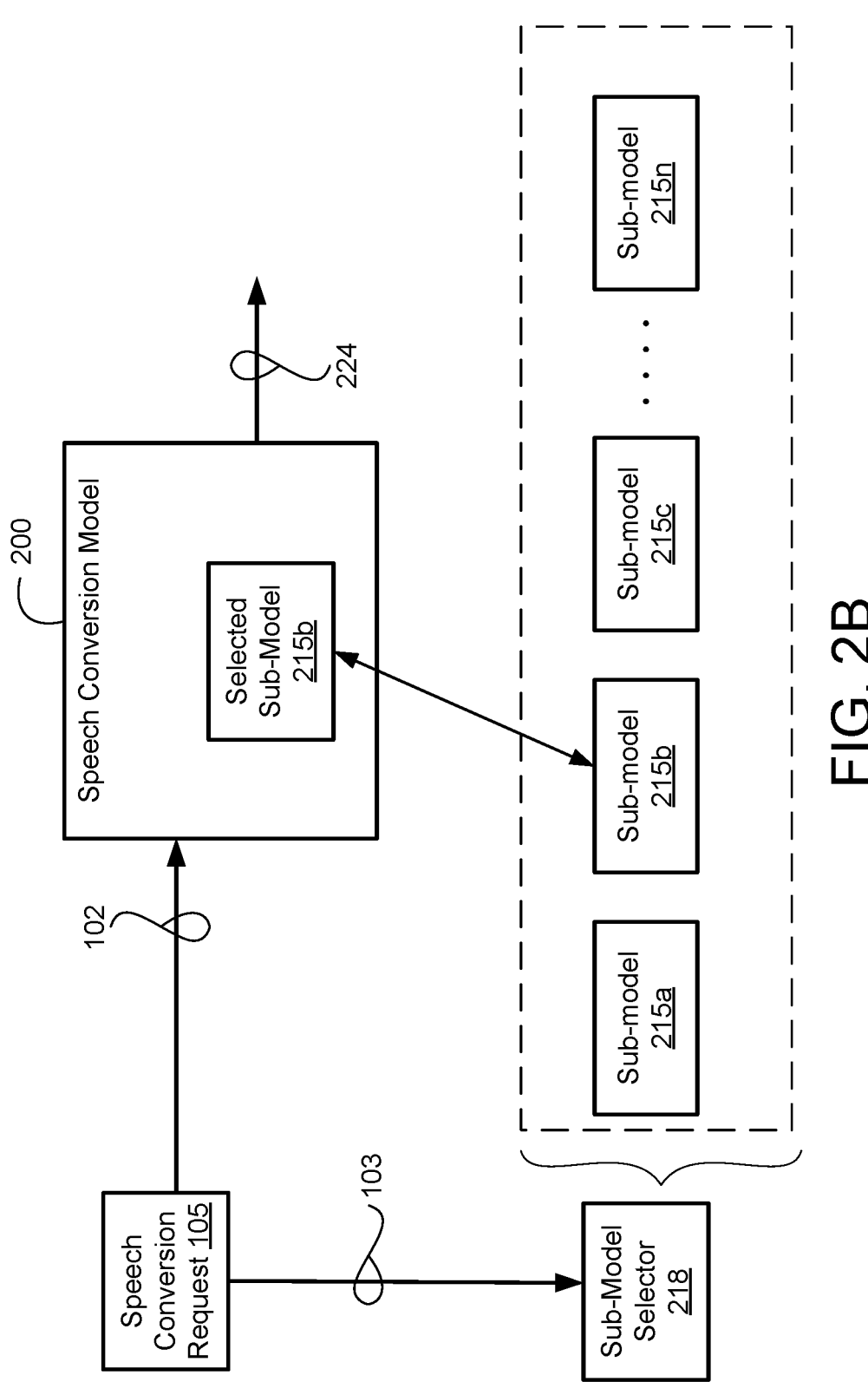
FIG. 2B is a schematic view of a speech conversion model for producing a speech representation using a selected sub-model.

Referring now to FIG. 2B, another exemplary speech conversion model 200 implements a selected sub-model 215, 215b to produce the biased speech representation 224 (e.g., synthesized canonical fluent speech representation 224). Here, the speech conversion model 200 receives a speech conversion request 105 including the audio data 102 and the speaker identifier 103. In this instance, the speaker identifier 103 is received by a sub-model selector 218. The sub-model selector 218 selects a particular sub-model 215 from a plurality of sub-models 215, 215a—n, where each sub-model 215 corresponds to one or more different domains. The sub-models 215a—n may be trained on data reflecting any domain that provides context for processing the audio input 102. For example, the selected sub-model 215b is based on a domain such as a location, an activity, a user profile, a speech type, or any other domain that can influence how to process the audio data 102. The speaker identifier 103 may be a one-hot vector indicating a particular domain corresponding to the context of the speech conversion request 105. Upon receiving the speaker identifier 103, the sub-model selector 218 may perform a look-up to determine the appropriate sub-model(s) 215 to use in processing the speech conversion request 105. The various sub-models 215a—n are easily swappable such that in processing a streaming audio input 102 from the user device 110, the speech conversion model 200 may swap in and out various sub-models 215 from the plurality of sub-models 215a—n (i.e., disable or enable the biasing provided by the sub-models 215) while processing the streaming input when new speaker identifiers 103 are received. When the speech conversion request 105 does not include a speaker identifier 103 or when the speaker identifier 103 is not applicable to any available sub-model 215, then the speech conversion model 200 processes the audio input 102 without activating or enabling any sub-model 215 to produce the unbiased speech representation 222 (FIG. 1).

Figure 3A:
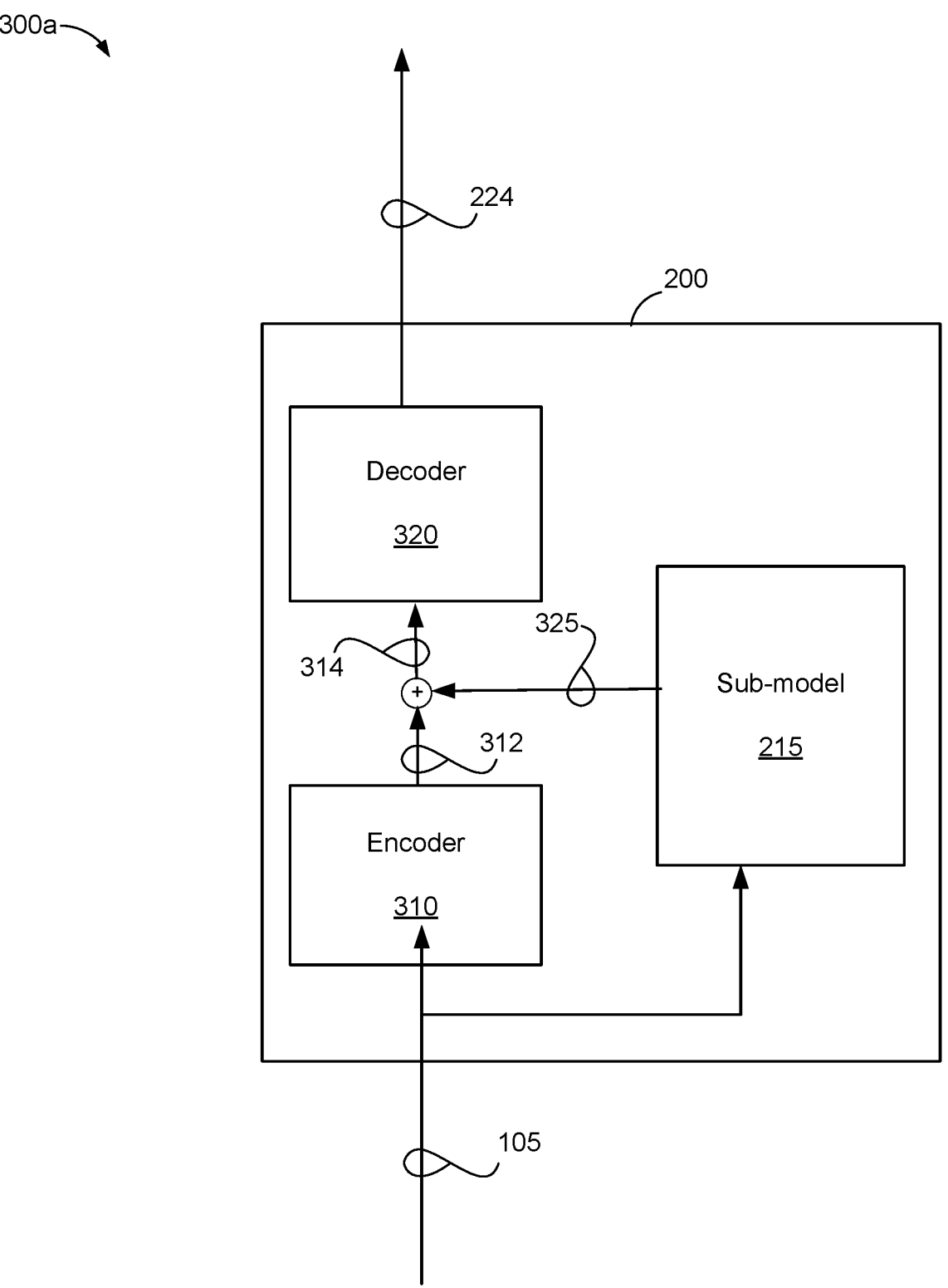
FIG. 3A is a schematic view of a speech conversion model for producing speech representation using a sub-model as a residual adaptor layer.
Figure 3B:
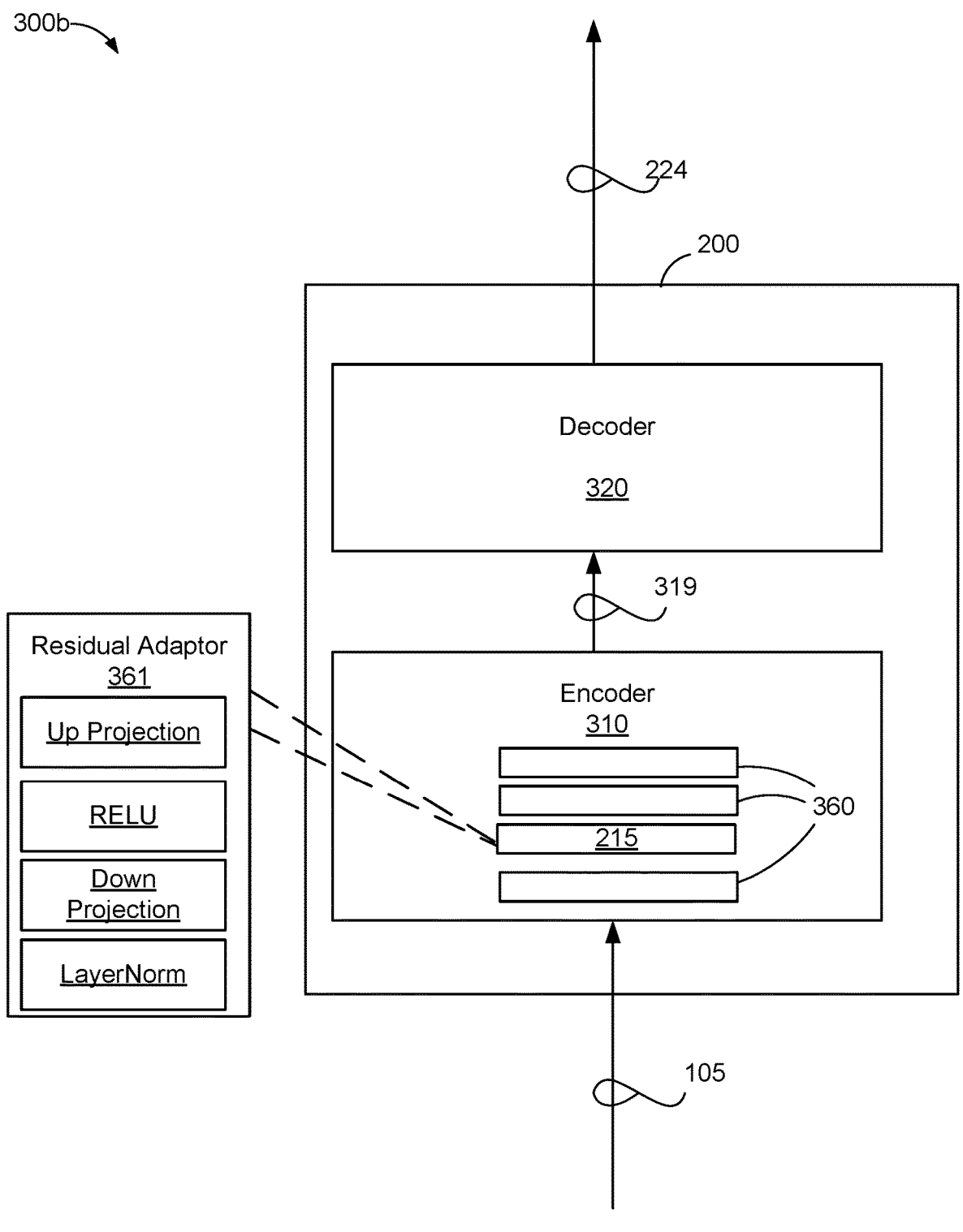
FIG. 3B is a schematic view of a speech conversion model for producing speech representation using a sub-model as a residual adaptor layer disposed between layers of an encoder.

The sub-model 215 may be implemented to bias the output of the speech conversion model 200 in any number of ways. FIG. 3A illustrates a schematic view 300a of a speech conversion model 200 for producing biased speech representations 224 using a sub-model 215 implemented as a residual adaptor layer 361 (FIG. 3B). The speech conversion model 200 may be a recurrent neural network (RNN) including an encoder 310 configured to encode the input audio data 102 into an encoded output 312 (e.g., a hidden feature representation including series of vectors) and a decoder 320 configured to decode the encoded output 312 into the biased speech representations 224. Typically, the encoded output 312 is sent straight to the decoder 320 to generate the unbiased speech representation 222. However, in this example, the sub-model 215 operates in parallel to process the speech conversion request 105. In turn, the sub-model 215 may generate a sub-model output 325 based on the received audio input 102 of the speech conversion request 105. The speech conversion model 200 may merge the sub-model output 325 and the encoded output 312 to produce a biased encoded output 314 to send to the decoder 320.

In another example, the sub-model 215 is implemented between layers of the encoder 310. FIG. 3B illustrates an example schematic view 300b of such an implementation. The encoder 310 may include a number of components 360, and the sub-model 215 may be disposed in between layers of the components 360 such that the encoder 310 produces a biased encoded output 319. The components 360 of the encoder may include a stack of multi-head attention blocks (i.e., conformer blocks) which may include conformers or transformers. In some implementations, each multi-head attention block includes a multi-head attention mechanism. The encoder 310 may include a stack of long short-term memory (LSTM) in lieu of multi-head attention blocks. The decoder 320 may receive the biased encoded output 319 and generate the biased representation 224.

Here, the sub-model 215 may be implemented as one or more residual adaptor layer 361 disposed between the components 360 of the encoder 310 (e.g., a stack of self-attention blocks each having a multi-headed self-attention mechanism). Each residual adaptor layer 361 may start with layer normalization applied to the inputs, followed by a feed-forward layer with down-projection to dimension $d_b$ (a bottleneck dimension), a non-linear activation (RELU), and another feed-forward layer with up-projection to the original input dimension $d_i$. In some implementations, all weights of the residual adaptor 361 are randomly initialized. In a specific example, each sub-model 215 include 17 residual adaptor layers 361, each of which is added between a layer of the encoder. Further, the bottleneck $d_b$ may be set at 64 while all weights of the adaptor are randomly initialized.

Residual adaptor layers 361 provide several benefits for the implementations of sub-models 215. For example, residual adaptor layers 361 are easily added to the encoder, allowing for various sub-models 215 to easily be interchanged as necessary. Further, a sub-model 215 can easily be muted/disabled by setting the residual factor to zero (i.e., removing the sub-model 215 and allowing the speech conversion model 200 to operate in an unbiased manner). The size of the sub-model 215, when implemented as a residual adaptor layer 361, can be controlled by a bottle neck dimension (e.g., $d_b$) depending on the task/use-case (i.e., the domain associated with the speaker identifier 103). Further, controlling the bottleneck dimension is internal to the sub-model 215, allowing for pre-compiled and optimized execution graph for fast inference while being able to replace a tensor shape dynamically.

Figure 3C:
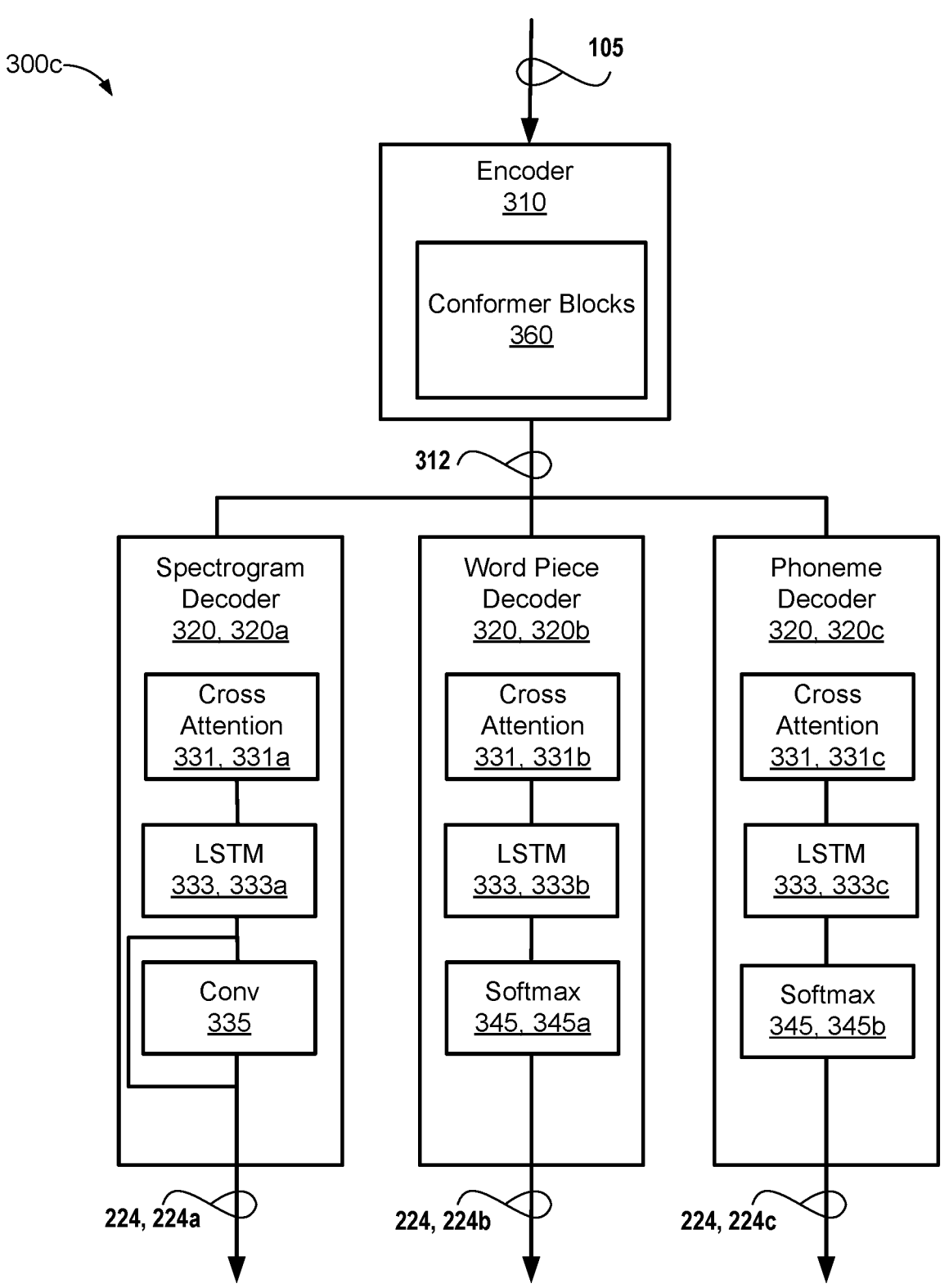
FIG. 3C is a schematic view of a speech conversion model having various decoders.

FIG. 3C shows a schematic view of an example speech conversion model 200 used by the speech conversion system 100 of FIG. 1. The speech conversion model 200 includes the encoder 310 and one or more decoders 320, 320a—c. The encoder 310 is configured to encode the input audio data 102 of speech conversion request 105 into an encoded spectrogram 312. Here, the input audio data 102 includes a sequence of input spectrograms that correspond to the utterance 108 spoken by the target speaker 104. In some implementations, the encoder 310 includes a stack of conformer blocks 360 and/or one or more sub-models 215 disposed between the conformer blocks 360. In these implementations, the encoder 310 subsamples the input audio data 102 using a convolutional layer, and then processes the input audio data 102 with the stack of Conformer blocks 360. Each Conformer block 360 may include a feed-forward layer, a self-attention layer, a convolution layer, and a second feed-forward layer. In some examples, the stack of Conformer blocks 360 includes 17 layers of Conformer blocks 360 each with 512 states, 8 attention heads and 32×1 convolutional kernel size. The encoder 310 may instead use a stack of transformer blocks, lightweight convolutional blocks, or other type of multi-head attention blocks in lieu of Conformer blocks.

The spectrogram, phoneme, and word piece decoders 320, 320a—c may each include recurrent neural network-based architectures that each receive the shared encoded spectrogram 312 output by the encoder 310. The spectrogram decoder 320a may include a cross-attention mechanism 331, 331a configured to receive the shared encoded spectrogram 312 from the encoder 310. The spectrogram decoder 320a may further process the shared encoded spectrogram 312 using a number of long-short term memory (LSTM) layers 333,333a and a number of Convolutional layers 335. For example, the spectrogram decoder 320a may include five (5) LSTM layers 333a and five (5) conversion layers 335. The spectrogram decoder 320a may generate an output spectrogram 224, 224a (i.e., speech representation 224). In some implementations, the spectrogram decoder 320a can generate the output spectrogram 224a from the encoded spectrogram 312 directly without performing any intermediate text-to-speech conversion on a textual representation corresponding to a transcription of the utterance.

In the example shown, the word piece decoder 320b includes a corresponding cross-attention mechanism 331, 331b configured to receive the shared encoded spectrogram 312 from the encoder 310, followed by two long-short term memory (LSTM) layers 333, 333b and a Softmax layer 345, 345a that outputs a textual representation 224, 224b corresponding to a transcription of the utterance 108. The textual representation 224 may be a transcription of the utterance 108 spoken by the target speaker 104 as a synthesized canonical fluent speech representation 224.

Like the word piece decoder 320b, the phoneme decoder 320c may also include a cross-attention mechanism 331, 331c configured to receive the shared encoded spectrogram 312 from the encoder 310, followed by two long-short term memory (LSTM) layers 333, 333c and a Softmax layer 345, 345b that output a phoneme representation 224, 224c of the utterance 108. Here, the phoneme representation 224c includes phonemes indicative of the synthesized canonical fluent speech representation 224 of the utterance 108.

The above examples of FIGS. 3A, 3B, and 3C are for illustrative purposes only and are not intended to be limiting. The speech conversion model 200 and the sub-model 215 may include any suitable structure/architecture for performing speech conversion and generating biased speech representations 224 in response to a speaker identifier 103. Further, the sub-model 215 and speech conversion model 200 may work in any suitable combination to produce biased speech representations 224. For example, the sub-model 215 is disposed within the speech conversion model 200 at any suitable place in the architecture of the speech conversion model 200. For example, a sub-model 215 is deployed within a layer of the speech conversion model 200, as a residual adaptor layer, as a tensor, as encoder/decoder layers, as a prediction network, as a joint network, etc. Alternatively, the sub-model 215 and speech conversion model 200 may generate outputs independently of one another, and the results may be combined by the speech conversion model 200, or another suitable component of the system, to determine biased speech representations 224. Notably, the speech conversion model 200 remains unchanged when the sub-model 215 is disabled from the original frozen state of the speech conversion model 200. That is, when the sub-model 215 is disabled (e.g., because there is no speaker identifier 103), the speech conversion model 200 produces the unbiased speech representation 222 that is not affected by the sub-model 215.

Figure 4:
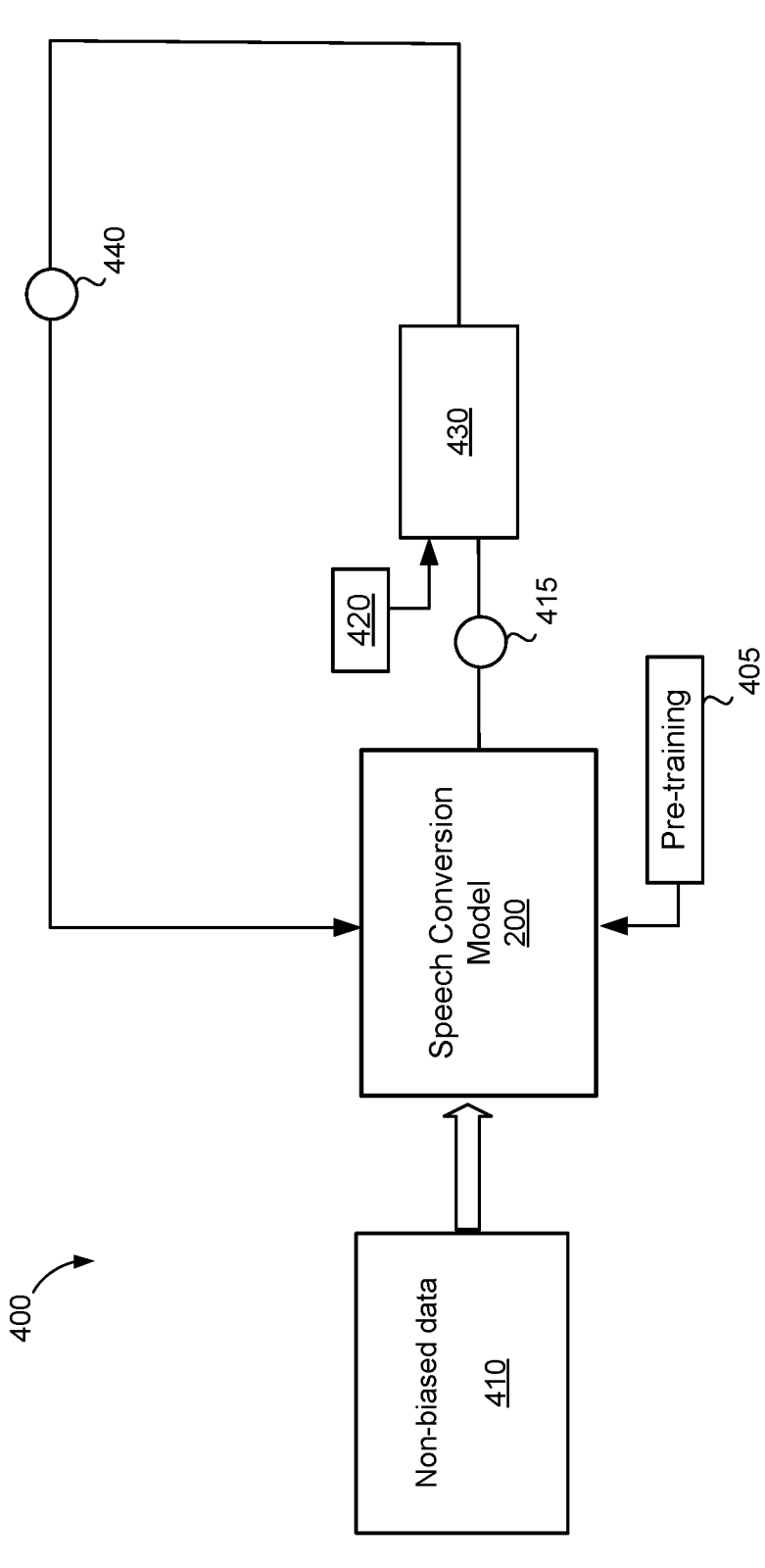
FIG. 4 is a schematic view of an example training scheme for the speech conversion model.

FIG. 4 illustrates a training process 400 for a speech conversion model 200. The speech conversion model 200 may be specifically adapted to normalize/convert dysarthric and atypical speech into synthesized canonical fluent speech representations 224 (e.g., typical speech). The speech conversion model 200 may be trained in an end-to-end training process 400 to directly map the input spectrogram to another spectrogram, without utilizing or relying on any intermediate discrete representation. The generated output spectrogram (e.g., speech representation 222/224) may be passed to a vocoder to produce a time-domain wave-form. Alternatively, the output spectrogram may produce transcripts in parallel, effectively making the speech conversion model 200 an ASR system as well. In some implementations, the process 400 employs a two-step training technique including pre-training and training. Pre-training a model is a technique used for initializing a model which can then be further fine-tuned based on additional training data 410. For the speech model 200, pre-training may include initiating the speech conversion model 200 with pre-training data 405 including a plurality of spoken utterances by one or more speakers. The pre-training data 405 may further include the spoken utterances paired with corresponding ground-truth synthesized speech representations of the spoken utterances 108. The speech samples used for pre-training may be speech synthesized from reference transcripts in a predetermined voice and/or non-synthetic speech samples spoken by real humans.

The process 400, after pre-training is complete, may fine-tune parameters of the pre-trained speech conversion model 200. The training process 400 includes training, for example, an encoder 310 and/or decoder 320 (FIG. 3A) separately or jointly in any suitable combination. The process 400 includes feeding a training input 410 to the speech conversion model 200. The speech conversion model 200 may be trained on training data 410 that is generalized such that the speech conversion model 200 is a generic model that can further be personalized/biased using sub-models. The training data 410 may be speaker and/or domain independent. In some implementations, the training input 410 includes a plurality of speech samples spoken by a variety of different speakers. Here, the training inputs 410 may include speech samples from users with typical speech. Further, the training input 410 may be labeled using label 420 indicating a target output associated with the training input 410. Upon receiving the training input 410, the speech conversion model 200 may generate an output 415 (e.g., an unbiased speech representation 222). The speech conversion model 200 may process the training input 410 in the manner described with respect to any of FIGS. 2A-3C or any other suitable manner for speech conversion.

In some implementations, the output 415 is used by a loss function 430 to generate a loss 440. That is, the loss function 430 compares the output 415 and the label 420 to generate the loss 440, where the loss 440 indicates a discrepancy between the label 420 (i.e., the target output) and the output 415. The loss functions 430 may implement any suitable technique to determine a loss such as regression loss, mean squared error, mean squared logarithmic error, mean absolute error, binary classification, binary cross entropy, hinge loss, multi-class loss, etc. The loss 440 may then be fed directly to the speech conversion model 200. Here, the speech conversion model 200 processes the loss 440 and adjusts one or more parameters of the speech conversion model 200 to account for the loss 440. In some implementations, when the speech conversion model 200 is suitably trained, the model is frozen. In other words, the parameters remain unchanged for a period of time until it is deemed that the speech conversion model 200 needs to be retrained (e.g., when sufficient new training data 410 is obtained) or replaced.

Figure 5:
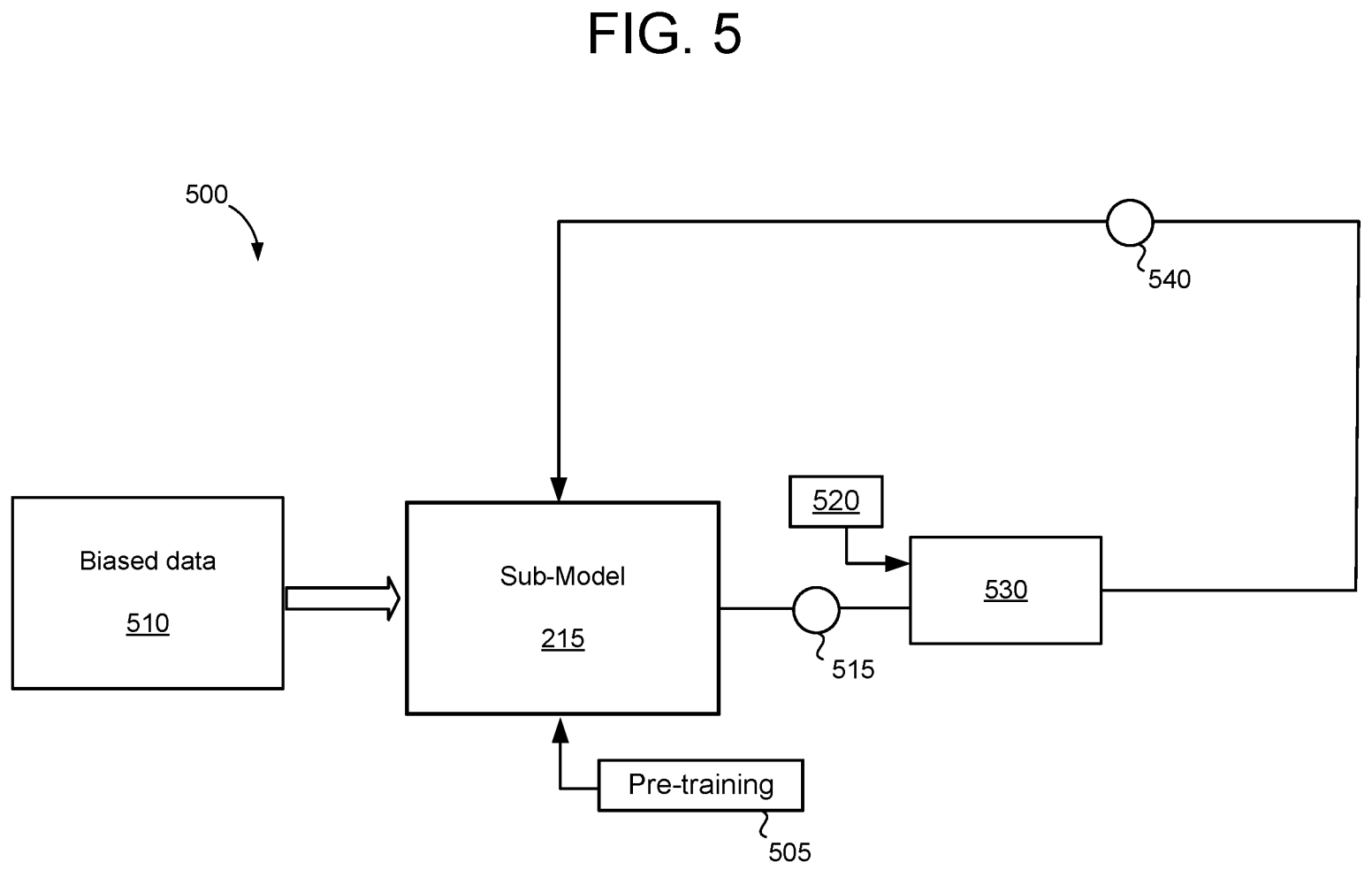

FIG. 5 illustrates a training process 500 for a sub-model 215. In some implementations, the process 500 employs a two-step training technique including pre-training and training. Pre-training is a technique used for initializing a model which can then be further fine-tuned based on additional training data 510. For the sub-model 215, pre-training may include initiating the sub-model 215 with pre-training data 505 including a plurality of spoken utterances by speakers. The pre-training data 505 may further include the spoken utterances paired with corresponding ground-truth synthesized speech representations of the spoken utterances. The speech samples used for pre-training may be speech synthesized from reference transcripts in a predetermined voice. For the sub-model 215, pre-training may further include adjusting one or more parameters of the sub-model 215 such that the sub-model 215 is biased to words and/or phrases of corresponding to a particular user and/or a particular domain (e.g., speech type) associated with sub-model 215.

The process 500, in some examples, includes fine-tuning parameters of the pre-trained sub-model 215. In these examples, the process 500 includes feeding a training input 510 to the sub-model 215. In some implementations, the training input 510 includes a plurality of speech samples spoken by a particular speaker and/or speakers corresponding to a particular speech type. The training input 510 may also include a speaker identifier 103 and transcript with each speech sample. The transcript may be a manually generated text representative of the corresponding speech sample. In some implementations, the transcript is machine generated. The transcript should accurately reflect the corresponding speech sample such that the transcript is a target output of the sub-model 215. In some implementations, the speaker identifier 103 of the training input 510 may indicate a particular domain (e.g., a particular user or a particular type of speech). In other implementations, the speaker identifier 103 of the training input 510 may include a one-hot vector. The sub-model 215 corresponding to the speaker identifier 103 may be trained on the speech sample and transcript such that the sub-model 215 is biased towards the particular user and/or particular type of speech associated with the speaker identifier 103. In the example of a single sub-model 215 adapted to bias for multiple speech types, the one-hot vector of the speaker identifier 103 may be concatenated and projected into a phrase set embedding which can then be used to train the sub-model 215. Further, the training input 510 may be labeled using label 520 indicating a target output associated with the training input 510. Upon receiving the training input 510, the sub-model 215 may generate an output 515 (e.g., a biased speech representation 224). The sub-model 215 may process the training input 510 in the manner described with respect to any of FIGS. 2A-3C or any other suitable manner for speech conversion.

In some implementations, the output 515 is used by a loss function 530 to generate a loss 540. That is, the loss function 530 compares the output 515 and the label 520 to generate the loss 540, where the loss 540 indicates a discrepancy between the label 520 (i.e., the target output) and the output 515. The loss functions 530 may implement any suitable technique to determine a loss such as regression loss, mean squared error, mean squared logarithmic error, mean absolute error, binary classification, binary cross entropy, hinge loss, multi-class loss, etc. The loss 540 may then be fed directly to the sub-model 215. Here, the sub-model 215 processes the loss 540 and adjusts one or more parameters of the sub-model 215 to account for the loss 540. In some implementations, the sub-model 215 is continually trained (or retrained) as additional speech conversion requests are received. For example, while the speech conversion model 200 is frozen, the sub-model 215 can continue to adjust parameters based on received speech conversion requests 105 including audio data 102, speaker identifiers 103, as well as the biased speech representations 224. Here, in the case of a plurality of sub-models 215, each sub-model 215 can be trained upon use by the speech conversion model 200 for biasing to an associated domain.

While examples herein are directed toward a sub-model 215 that biases a speech conversion model 200 for speech conversion (and speech recognition using the wordpiece and/or phoneme decoders), it is understood that the sub-model 215 and speaker identifier 103 can be used to bias any sort of model used for any purpose. For example, sub-models 215 can bias an image recognition model, recommendation models, filtering (e.g., email) models, medical diagnoses models, or any other model where contextual information can be used to bias the results to increase accuracy. As described above, the sub-models 215 may be trained on appropriate speaker identifiers 103 to properly bias the underlying base model.

FIG. 6 is a flow chart of an exemplary arrangement of operations for performing speech conversion using a speech conversion model 200 and a sub-model 215. The method 600 may be performed, for example, by various elements of the speech conversion system 100 of FIG. 1. At operation 602, the method 600 includes obtaining a speech conversion model 200 configured to convert input utterances 108 of human speech directly into corresponding output utterances of synthesized speech. At operation 604, the method 600 includes receiving a speech conversion request 105 including input audio data 102 corresponding to an utterance 108 spoken by a target speaker 104 associated with atypical speech and a speaker identifier 103 uniquely identifying the target speaker 104. At operation 606, the method 600 includes activating, using the speaker identifier 103, a particular sub-model 215 for biasing the speech conversion model 200 to recognize a type of the atypical speech associated with the target speaker 104 identified by the speaker identifier 103. At operation 608, the method 600 includes converting, using the speech conversion model 200 biased by the activated particular sub-model 215, the input audio data 102 corresponding to the utterance 108 spoken by the target speaker 104 associated with atypical speech into output audio data corresponding to a synthesized canonical fluent speech representation 224 of the utterance 108 spoken by the target speaker 104.

Figure 7:
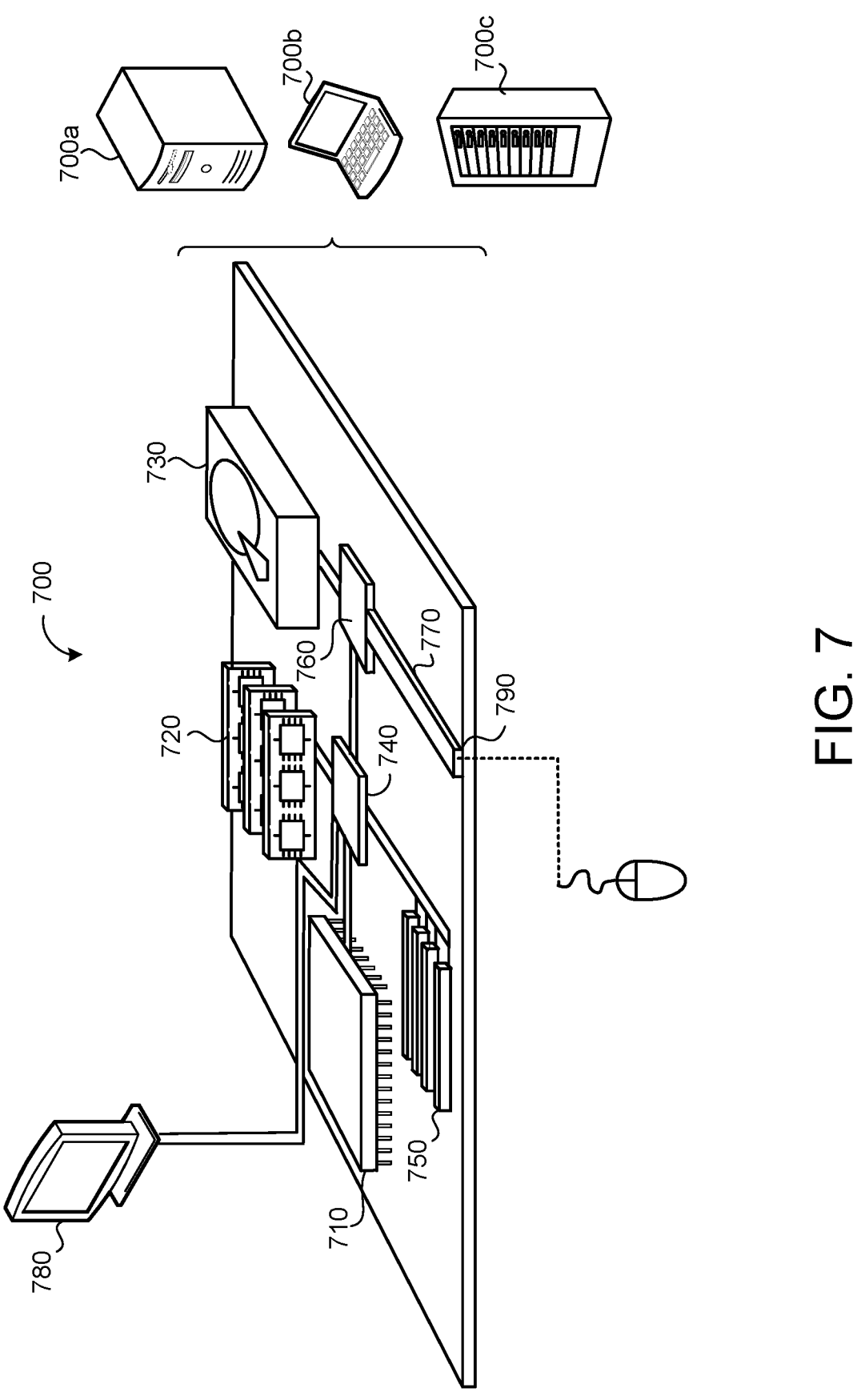
FIG. 7 is a schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:

obtaining a speech conversion model configured to convert input utterances of human speech directly into corresponding output utterances of synthesized speech, the speech conversion model comprising an encoder and a decoder;

receiving a speech conversion request comprising input audio data corresponding to an utterance spoken by a target speaker associated with atypical speech and a speaker identifier uniquely identifying the target speaker;

activating, using the speaker identifier, a particular sub-model for biasing the speech conversion model to recognize a type of the atypical speech associated with the target speaker identified by the speaker identifier; and converting, using the speech conversion model biased by the activated particular sub-model, the input audio data corresponding to the utterance spoken by the target speaker associated with atypical speech into output audio data corresponding to a synthesized canonical fluent speech representation of the utterance spoken by the target speaker by:

generating, as output from the encoder configured to receive the input audio data as input, encoded audio data, the encoded audio data including a series of vectors; and generating, as output from the decoder configured to receive the encoded audio data output from the encoder as input, the output audio data corresponding to the synthesized canonical fluent representation of the utterance spoken by the target speaker.

2. The computer-implemented method of claim 1, wherein the speech conversion model is:

trained on generalized training data; and speaker- and domain-independent.

3. The computer-implemented method of claim 1, wherein generating the output audio data corresponding to the synthesized canonical fluent representation of the utterance spoken by the target speaker comprises generating the output audio data corresponding to the synthesized canonical fluent representation of the utterance spoken by the target speaker without performing any intermediate text-to-speech conversion on a textual representation corresponding to a transcription of the utterance.

4. The computer-implemented method of claim 3, wherein the encoder comprises a stack of self-attention blocks each having a multi-headed self attention mechanism.

5. The computer-implemented method of claim 4, wherein the particular sub-model comprises a stack of residual adaptors disposed between each of the self-attention blocks in the stack of self-attention blocks of the encoder.

6. The computer-implemented method of claim 5, wherein each residual adaptor comprises a normalization layer, followed by a feed-forward layer with down-projection to a bottleneck dimension and a non-linear activation, and another feed-forward layer with up-projection.

7. The computer-implemented method of claim 3, wherein the speech conversion model further comprises a wordpiece decoder configured to:

receive, as input, the encoded audio data from the encoder; and generate, as output, a textual representation corresponding to a transcription of the utterance.

8. The computer-implemented method of claim 3, wherein the speech conversion model further comprises a phoneme decoder configured to:

receive, as input, the encoded audio data from the encoder; and generate, as output, a phoneme representation of the utterance.

9. The computer-implemented method of claim 1, wherein:

the input audio data comprises one of an input spectrogram or an input audio waveform; and the output audio data comprises one of an output spectrogram or an output audio waveform.

10. The computer-implemented method of claim 1, wherein activating the particular sub-model for biasing the speech conversion model comprises:

selecting, from among a plurality of sub-models each associated with a different type of atypical speech, the particular sub-model associated with the type of atypical speech associated with the target speaker; and loading the particular sub-model into the speech conversion model for biasing the speech conversion model to recognize the type of the atypical speech associated with the target speaker.

11. A system comprising:

data processing hardware; and memory hardware in communication with the data processing hardware, the memory hardware storing instructions that when executed on the data processing hardware cause the data processing hardware to perform operations comprising:

obtaining a speech conversion model configured to convert input utterances of human speech directly into corresponding output utterances of synthesized speech, the speech conversion model comprising an encoder and a decoder;

receiving a speech conversion request comprising input audio data corresponding to an utterance spoken by a target speaker associated with atypical speech and a speaker identifier uniquely identifying the target speaker;

activating, using the speaker identifier, a particular sub-model for biasing the speech conversion model to recognize a type of the atypical speech associated with the target speaker identified by the speaker identifier; and converting, using the speech conversion model biased by the activated particular sub-model, the input audio data corresponding to the utterance spoken by the target speaker associated with atypical speech into output audio data corresponding to a synthesized canonical fluent speech representation of the utterance spoken by the target speaker by:

generating, as output from the encoder configured to receive the input audio data as input, encoded audio data, the encoded audio data including a series of vectors; and generating, as output from the decoder configured to receive the encoded audio data output from the encoder as input, the output audio data corresponding to the synthesized canonical fluent representation of the utterance spoken by the target speaker.

12. The system of claim 11, wherein the speech conversion model is:

trained on generalized training data; and speaker- and domain-independent.

13. The system of claim 11, wherein generating the output audio data corresponding to the synthesized canonical fluent representation of the utterance spoken by the target speaker comprises generating the output audio data corresponding to the synthesized canonical fluent representation of the utterance spoken by the target speaker without performing any intermediate text-to-speech conversion on a textual representation corresponding to a transcription of the utterance.

14. The system of claim 13, wherein the encoder comprises a stack of self-attention blocks each having a multi-headed self attention mechanism.

15. The system of claim 14, wherein the particular sub-model comprises a stack of residual adaptors disposed between each of the self-attention blocks in the stack of self-attention blocks of the encoder.

16. The system of claim 15, wherein each residual adaptor comprises a normalization layer, followed by a feed-forward layer with down-projection to a bottleneck dimension and a non-linear activation, and another feed-forward layer with up-projection.

17. The system of claim 13, wherein the speech conversion model further comprises a wordpiece decoder configured to:

receive, as input, the encoded audio data from the encoder; and generate, as output, a textual representation corresponding to a transcription of the utterance.

18. The system of claim 13, wherein the speech conversion model further comprises a phoneme decoder configured to:

receive, as input, the encoded audio data from the encoder; and generate, as output, a phoneme representation of the utterance.

19. The system of claim 11, wherein:

the input audio data comprises one of an input spectrogram or an input audio waveform; and the output audio data comprises one of an output spectrogram or an output audio waveform.

20. The system of claim 11, wherein activating the particular sub-model for biasing the speech conversion model comprises:

selecting, from among a plurality of sub-models each associated with a different type of atypical speech, the particular sub-model associated with the type of atypical speech associated with the target speaker; and loading the particular sub-model into the speech conversion model for biasing the speech conversion model to recognize the type of the atypical speech associated with the target speaker.

* * * * *